United States Patent [19]

Nakajima et al.

[11] Patent Number: 5,315,507
[45] Date of Patent: May 24, 1994

[54] ENERGY SUBTRACTION PROCESSING METHOD AND APPARATUS, SUPERPOSITION PROCESSING METHOD AND APPARATUS, AND RADIATION IMAGE READ-OUT APPARATUS

[75] Inventors: Nobuyoshi Nakajima; Toshitaka Agano, both of Kanagawa, Japan

[73] Assignee: Fuji Photo Film Co., Ltd., Kanagawa, Japan

[21] Appl. No.: 586,350

[22] Filed: Sep. 21, 1990

[30] Foreign Application Priority Data

Sep. 22, 1989 [JP] Japan ................................ 1-246944
Sep. 22, 1989 [JP] Japan ................................ 1-246945
Oct. 3, 1989 [JP] Japan ................................ 1-258539
Oct. 18, 1989 [JP] Japan ................................ 1-270736

[51] Int. Cl.$^5$ .............................................. G06F 15/68
[52] U.S. Cl. ........................... 364/413.23; 364/413.19; 364/413.13
[58] Field of Search ...................... 364/413.13, 413.19, 364/413.23; 250/327.2, 484.1

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.1 |
| 4,315,318 | 2/1982 | Kato et al. | 364/413.13 |
| 4,387,428 | 6/1983 | Ishida et al. | 364/413.13 |
| 4,575,810 | 3/1989 | Stoub | 364/581 |
| 4,685,146 | 8/1987 | Fenster et al. | 382/54 |
| 4,710,875 | 12/1987 | Nakajima et al. | 364/413.13 |
| 4,761,739 | 8/1988 | Shimura | 364/413.23 |
| 4,802,093 | 1/1989 | Ema | 364/413.23 |
| 4,816,681 | 3/1989 | Shimura | 205/327.2 |
| 4,855,598 | 8/1989 | Ohgoda et al. | 250/327.2 |
| 4,870,692 | 4/1989 | Zuiderveld et al. | 382/6 |
| 4,896,037 | 1/1990 | Shimura et al. | 250/327.2 |
| 4,903,205 | 2/1990 | Hishinuma | 364/413.13 |
| 4,951,201 | 8/1990 | Takeo et al. | |
| 4,977,322 | 12/1990 | Agano et al. | 250/327.2 |
| 5,031,620 | 7/1991 | Oe | 128/635 R |
| 5,048,110 | 9/1991 | Nakajima | 382/54 |

FOREIGN PATENT DOCUMENTS

| | | |
|---|---|---|
| 0137465 | 4/1985 | European Pat. Off. . |
| 0154404 | 11/1985 | European Pat. Off. . |
| 2555003 | 5/1985 | France . |
| 56-11395 | 2/1981 | Japan . |
| 61-5193 | 2/1986 | Japan . |
| 62-62373 | 12/1987 | Japan . |

Primary Examiner—Roy N. Envall, Jr.
Assistant Examiner—A. Bodendorf
Attorney, Agent, or Firm—Sughrue, Mion, Zinn, Macpeak & Seas

[57] ABSTRACT

An energy subtraction processing method and apparatus for radiation images includes irradiating radiation, which has a predetermined energy range, into an object in a recording unit, and irradiating the radiation, which has passed through the object, to a recording medium capable of recording a plurality of radiation images during its exposure to radiation with different energy distributions. A plurality of radiation images of the object are thereby recorded on the recording medium. From the recording medium on which the radiation images have been recorded, a plurality of image signals are obtained by a read-out unit. The image signals represent the radiation images of the object. A modulation transfer function (MTF) correcting process is carried out on the image signals in an operation unit such that differences between MTF's of the radiation images of the object may be eliminated. Subtracting operations are then carried out in the operation unit on image signals, which are obtained from the MTF correcting process.

40 Claims, 5 Drawing Sheets

ENERGY SUBTRACTION PROCESSING METHOD AND APPARATUS, SUPERPOSITION PROCESSING METHOD AND APPARATUS, AND RADIATION IMAGE READ-OUT APPARATUS

BACKGROUND OF THE INVENTION

1. Field of the Invention

This invention relates to an energy subtraction processing method for radiation images, and an apparatus for carrying out the energy subtraction processing method for radiation images. This invention also relates to a superposition processing method for radiation images, and an apparatus for carrying out the superposition processing method for radiation images. This invention further relates to an apparatus for reading out radiation images from two or more stimulable phosphor sheets and obtaining the image signals, which represent the radiation images and which are to be subjected to one-shot energy subtraction processing or superposition processing.

2. Description of the Prior Art

Techniques for reading out a recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal, and the electric signal (image signal) is processed and then used for reproducing the X-ray image as a visible image on a copy photograph or the like. In this manner, a visible image having good image quality with high contrast, high sharpness, high graininess, or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor. As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. In this manner, a radiation image of the object is stored on the stimulable phosphor sheet. The stimulable phosphor sheet, on which the radiation image has been stored, is then scanned with stimulating rays, such as a laser beam, which cause it to emit light in proportion to the amount of energy stored during exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT), or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order for the desired image density to be obtained, an appropriate read-out gain is set when the emitted light is being detected and converted into an electric signal (image signal) to be used in the reproduction of a visible image on a recording material, such as photographic film, or on a display device, such as a CRT.

In the radiation image recording and reproducing systems wherein recording media, such as X-ray film or stimulable phosphor sheets are used, subtraction processing techniques for radiation images are often carried out on image signals detected from a plurality of radiation images of an object which have been recorded on the recording media.

With the subtraction processing techniques for radiation images, an image is obtained which corresponds to a difference between a plurality of radiation images of an object recorded under different conditions. Specifically, a plurality of the radiation images recorded under different conditions are read out at predetermined sampling intervals, and a plurality of image signals thus detected are converted into digital image signals which represent the radiation images. The image signal components of the digital image signals which represent the image information recorded at corresponding sampling points in the radiation images are then subtracted from each other. A difference signal is thereby obtained which represents the image of a specific structure or part of the object represented by the radiation images.

Basically, subtraction processing is carried out with either the so-called temporal (time difference) subtraction processing method or the so-called energy subtraction processing method. In the former method, in order for the image of a specific structure (for example, a blood vessel) of an object to be extracted from the image of the whole object, the image signal representing a radiation image obtained without injection of contrast media is subtracted from the image signal representing a radiation image in which the image of the specific structure (for example, a blood vessel) of the object is enhanced by the injection of contrast media. In the latter method, such characteristics are utilized that a specific structure of an object exhibits different levels of radiation absorptivity with respect to radiation with different energy levels. Specifically, an object is exposed several times to radiation with different energy levels, and a plurality of radiation images are thereby obtained in which different images of a specific structure are embedded. Thereafter, the image signals representing the plurality of the radiation images are weighted appropriately and subjected to a subtraction process in order to extract the image of the specific structure. The applicant proposed novel energy subtraction processing methods using stimulable phosphor sheets in, for example, U.S. Pat. Nos. 4,855,598 and 4,896,037.

With the energy subtraction processing method proposed in U.S. Pat. No. 4,896,037, the operation for recording a radiation image is carried out twice with two kinds of radiation different in energy level, the two radiation images thus recorded are read out, and two digital image signals are thereby obtained. A subtraction process is then carried out on the digital image signals. Also, U.S. Pat. No. 4,855,598 discloses an energy subtraction processing method (one-shot energy subtraction processing method) wherein two radiation images to be subjected to the energy subtraction processing are recorded with a single recording operation. With the disclosed method, for example, a filter which exhibits different levels of absorptivity with respect to different radiation energy levels is located between two recording media, and the two recording media are simultaneously exposed to radiation which has passed through an object.

When subtracting operations are carried out on the image signals, which represent a plurality of radiation images, with one of the energy subtraction processing methods described above, high-frequency components of the original radiation images remain in a difference image signal, which is obtained from the subtraction processing. The high-frequency components constitute an artifact in a visible image (subtraction image), which is reproduced from the difference image signal. As a result, the image quality of the subtraction image becomes bad.

Also, with the energy subtraction processing method proposed in U.S. Pat. No. 4,896,037, because a certain length of time occurs between the two operations for recording the radiation images, there is the risk that the object moves during the time interval. As a result, the two radiation images thus recorded do not coincide with each other, and a motion artifact occurs in the visible image reproduced from a difference image signal, which is obtained from the subtraction processing carried out on the image signals representing the two radiation images. Thus a visible image having good image quality cannot be obtained.

With the energy subtraction processing method proposed in U.S. Pat. No. 4,855,598, no motion artifact due to movement of the object occurs in the visible image (subtraction image) reproduced from a difference image signal, which is obtained from the subtraction processing carried out on the image signals representing the two radiation images. However, the proposed method has the problems in that, even when the image quality is identical for a center part and peripheral parts in each of the radiation images, which are subjected to the subtraction processing, the image quality of peripheral parts of a subtraction image obtained from the subtraction processing becomes worse than the image quality of the center part of the subtraction image.

Additionally, in the radiation image recording and reproducing systems wherein recording media, such as X-ray film or stimulable phosphor sheets are used, superposition processing techniques for radiation images are often carried out on image signals detected from a plurality of radiation images of an object which have been recorded on the recording media.

With the superposition processing techniques for radiation images, an image is obtained which corresponds to a sum (mean value) of image signals representing a plurality of radiation images of an object. The superposition processing techniques are carried out in order to eliminate or reduce noise components, such as quantum noise components of radiation used during the recording of a radiation image of an object Specifically, as disclosed in, for example, U.S. Pat. No. 4,356,398, a plurality of the radiation images are read out at predetermined sampling intervals, and a plurality of image signals thus detected are converted into digital image signals which represent the radiation images. The image signal components of the digital image signals which represent the image information recorded at corresponding sampling points in the radiation images are then weighted appropriately and added together.

However, the conventional superposition processing techniques have the problems in that, even when the radiation images subjected to the superposition processing were recorded simultaneously, and even when the image quality is identical for a center part and peripheral parts in each of the radiation images, which are subjected to the subtraction processing, the image quality of peripheral parts of a superposition image, which is obtained from the superposition processing, becomes worse than the image quality of the center part of the superposition image.

SUMMARY OF THE INVENTION

The primary object of the present invention is to provide an energy subtraction processing method for radiation images wherein a subtraction image is obtained which is free of an artifact caused to occur by high-frequency components of the radiation images subjected to the subtraction processing.

Another object of the-present invention is to provide an energy subtraction processing method for radiation images wherein a subtraction image is obtained which is free of an artifact caused to occur by movement of an object, and wherein the problems are prevented from occurring in that the image quality of peripheral parts of a subtraction image, which is obtained from subtraction processing, becomes worse than the image quality of the center part of the subtraction image.

A further object of the present invention is to provide an apparatus for carrying out the energy subtraction processing method for radiation images.

A still further object of the present invention is to provide a superposition processing method for radiation images wherein the problems are prevented from occurring in that the image quality of peripheral parts of a superposition image, which is obtained from superposition processing becomes worse than the image quality of the center part of the superposition image.

Another object of the present invention is to provide an apparatus for carrying out the superposition processing method for radiation images.

The specific object of the present invention is to provide a radiation image read-out apparatus wherein the problems are prevented from occurring in that the image quality of peripheral parts of a subtraction image or a superposition image becomes worse than the image quality of the center part of the subtraction image or the superposition image.

The present invention provides a first energy subtraction processing method for radiation images, which comprises the steps of:

i) irradiating radiation, which has been produced by a radiation source and which comprises radiation components having energy levels covering a predetermined energy range, to an object, ii) irradiating the radiation, which has passed through said object, to a recording medium capable of recording a plurality of radiation images during its exposure to radiation with different energy distributions, whereby a plurality of radiation images of said object are recorded on said recording medium, iii) from said recording medium on which the plurality of said radiation images have been recorded, obtaining a plurality of image signals representing the plurality of said radiation images of said object, iv) carrying out an MTF correcting process on the plurality of said image signals representing the plurality of said radiation images of said object such that differences between MTF's of said radiation images of said object represented by the plurality of said image signals may be eliminated, and v) carrying out subtracting operations on image signals, which are obtained from said MTF correcting process.

MTF is an acronym for a modulation transfer function.

The first energy subtraction processing method for radiation images in accordance with the present invention may be modified such that a plurality of recording media are utilized.

Specifically, the present invention also provides a second energy subtraction processing method for radiation images, which comprises the steps of:

i) irradiating radiation, which has been produced by a radiation source and which comprises radiation components having energy levels covering a predetermined energy range, to an object, ii) irradiating the radiation, which has passed through said object, simultaneously or sequentially to a plurality of recording media, each of which is capable of recording one of a plurality of radiation images during its exposure to radiation with different energy distributions, whereby the radiation images of said object are recorded on the plurality of said recording media, iii) from the plurality of said recording media on which said radiation images have been recorded, obtaining a plurality of image signals representing said radiation images of said object, iv) carrying out an MTF correcting process on the plurality of said image signals representing said radiation images of said object such that differences between MTF's of said radiation images of said object represented by the plurality of said image signals may be eliminated, and v) carrying out subtracting operations on image signals, which are obtained from said MTF correcting process.

The first energy subtraction processing method for radiation images in accordance with the present invention may be carried out with an apparatus described below.

Specifically, the present invention further provides a first energy subtraction processing apparatus for radiation images, which comprises:

i) a recording unit comprising:
  a) a radiation source which produces radiation comprising radiation components having energy levels covering a predetermined energy range,
  b) an object locating section in which an object is located, and
  c) a sheet supporting section which is located facing said radiation source with said object locating section intervening between said sheet supporting section and said radiation source, and in which a recording medium capable of recording a plurality of radiation images during its exposure to radiation with different energy distributions is located, ii) a read-out unit for obtaining a plurality of image signals representing a plurality of radiation images of said object from said recording medium, on which said radiation images of said object have been recorded in said recording unit, and iii) an operation unit comprising:
  a) an MTF correcting operation means for carrying out an MTF correcting process on the plurality of said image signals representing the plurality of said radiation images of said object such that differences between MTF's of said radiation images of said object represented by the plurality of said image signals may be eliminated, and
  b) a subtracting operation means for carrying out subtracting operations on image signals, which are obtained from said MTF correcting process.

The second energy subtraction processing method for radiation images in accordance with the present invention may be carried out with an apparatus described below.

Specifically, the present invention still further provides a second energy subtraction processing apparatus for radiation images, which comprises:

i) a recording unit comprising:
  a) a radiation source which produces radiation comprising radiation components having energy levels covering a predetermined energy range,
  b) an object locating section in which an object is located, and
  c) a sheet supporting section which is located facing said radiation source with said object locating section intervening between said sheet supporting section and said radiation source, and in which a plurality of recording media are located simultaneously or sequentially, each of said recording media being capable of recording one of a plurality of radiation images during its exposure to radiation with different energy distributions, ii) a read-out unit for obtaining a plurality of image signals representing the radiation images of said object from the plurality of said recording media, on which said radiation images of said object have been recorded in said recording unit, and iii) an operation unit comprising:
  a) an MTF correcting operation means for carrying out an MTF correcting process on the plurality of said image signals representing said radiation images of said object such that differences between MTF's of said radiation images of said object represented by the plurality of said image signals may be eliminated, and
  b) a subtracting operation means for carrying out subtracting operations on image signals, which are obtained from said MTF correcting process.

In the first energy subtraction processing method for radiation images and the first energy subtraction processing apparatus for radiation images in accordance with the present invention, a single recording medium is utilized which is capable of recording a plurality of radiation images during its exposure to radiation with different energy distributions. By way of example, the recording medium may be composed of a plurality of recording layers, each of which is capable of recording a single radiation image, and a filter which is located between the recording layers and which eliminates or attenuates radiation components having energy levels falling in a low energy region of the predetermined energy range of the radiation. Alternatively, the recording medium may be composed of a plurality of recording layers, one of which serves as a filter for eliminating or attenuating the radiation components having energy levels falling in a low energy region of the predetermined energy range of the radiation. As another alternative, the recording medium may be composed of a recording layer, which has a comparatively high sensitivity to the radiation components having energy levels falling in a low energy region of the predetermined energy range of the radiation, and a recording layer, which has a comparatively high sensitivity to the radiation components having energy levels failing in a high energy region of the predetermined energy range of the radiation (for example, a recording layer constituted of a stimulable phosphor represented by the formula BAFX, wherein X denotes a halogen, and a recording layer constituted of a stimulable phosphor represented by the formula SRFX, wherein X denotes a halogen). As a further alternative, the recording medium may be constituted of a single recording layer such that more of the radiation components having energy levels falling in a low energy region of the predetermined energy range of the radiation are attenuated than the radiation components having energy levels falling in a high energy region when the radiation passes through the recording layer. With this recording medium, a plurality of radiation images are recorded with radiation having different energy distributions at part in the vicinity of a front surface of the recording layer, which surface faces the radiation source, and at part in the vicinity of a rear surface of the recording layer.

In the second energy subtraction processing method for radiation images and the second energy subtraction processing apparatus for radiation images in accordance with the present invention, a plurality of recording media are utilized, each of which is capable of recording one of a plurality of radiation images during its exposure to radiation with different energy distributions.

Also, in the first and second energy subtraction processing methods for radiation images and the first and second energy subtraction processing apparatuses for radiation images in accordance with the present invention, an MTF correcting process is carried out on the plurality of image signals representing a plurality of radiation images of an object such that differences between MTF's of the radiation images may be eliminated. With the MTF correcting process, the MTF's of the plurality of the radiation images need not necessarily be rendered completely identical with one another. It is sufficient for the MTF's of the plurality of the radiation images to be rendered close to one another such that the image quality of a subtraction image obtained from the subtracting operations is better than a predetermined level in accordance with, for example, the characteristics of the subtraction image which is to be obtained. For example, the MTF's of the radiation images may be rendered close to one another over the whole spatial frequency ranges of the radiation images, or only for parts of the whole spatial frequency ranges that correspond to portions of the subtraction image, which are to be used and therefore are required to have an appropriate image quality in the reproduced image. Also, as a result of correcting the MTF of an image, which is inferior in the MTF to the other image, the corrected MTF may become superior to the MTF of the other image in parts of the whole spatial frequency ranges.

It was found that, for the reasons described below, an artifact is caused to occur in a subtraction image by the high-frequency components of the radiation images, which are subjected to the subtraction processing. Specifically, when a plurality of radiation images are recorded with a single recording operation, part of the radiation is scattered by a recording layer (or a recording medium), which is located close to the radiation source. In cases where a filter is located between recording layers, part of the radiation is also scattered by the filter. The radiation containing the thus scattered radiation then impinges upon a recording layer (or a recording medium), which is located remote from the radiation source. Therefore, the MTF of a radiation image thus recorded on the recording layer (or the recording medium), which is located remote from the radiation source, becomes inferior in the high frequency region than the MTF of a radiation image, which is recorded with the radiation containing no scattered radiation.

Also, in cases where a plurality of radiation images are recorded with a single recording operation or with a plurality of recording operations, the MTF's of the radiation images vary in accordance with the difference in the materials, thicknesses, or the like, of the plurality of the recording layers (or the recording media). In cases where a recording medium composed of a single recording layer is employed and radiation images are recorded at part in the vicinity of a front surface of the recording layer and at part in the vicinity of a rear surface thereof, the MTF's of the radiation images vary due to the material, thickness, or the like, of the recording layer.

With the first and second energy subtraction processing methods for radiation images and the first and second energy subtraction processing apparatuses for radiation images in accordance with the present invention, an MTF correcting process is carried out on the plurality of image signals representing a plurality of radiation images of an object such that differences between MTF's of the radiation images may be eliminated. Subtracting operations are then carried out on image signals, which are obtained from the MTF correcting process. Therefore, no artifact is caused to occur in the subtraction image by high-frequency components of the radiation images subjected to the subtraction processing, and the image quality of the subtraction image can be kept good.

The present invention also provides a third energy subtraction processing method for radiation images, which comprises the steps of:
  irradiating radiation, which has been produced by a radiation source and which comprises radiation components having energy levels covering a predetermined energy range, to an object,
  ii) irradiating the radiation, which has passed through said object, to a recording medium capable of recording a plurality of radiation images during its exposure to radiation with different energy distributions, whereby a plurality of radiation images of said object are recorded on said recording medium, iii) from said recording medium on which the plurality of said radiation images have been recorded, obtaining a plurality of image signals representing the plurality of said radiation images of said object, iv) carrying out a size correcting process on the plurality of said image signals representing the plurality of said radiation images of said object such that sizes of said radiation images of said object represented by the plurality of said image signals may become identical with one another, and v) carrying out subtracting operations on image signals, which are obtained from said size correcting process.

The third energy subtraction processing method for radiation images in accordance with the present invention may be modified such that a plurality of recording media are utilized.

Specifically, the present invention further provides a fourth energy subtraction processing method for radiation images, which comprises the steps of:

i) irradiating radiation, which has been produced by a radiation source and which comprises radiation components having energy levels covering a predetermined energy range, to an object, ii) irradiating the radiation, which has passed through said object, simultaneously to a plurality of recording media, each of which is capable of recording one of a plurality of radiation images during its exposure to radiation with different energy distributions, whereby the radiation images of said object are recorded on the plurality of said recording media, iii) from the plurality of said recording media on which said radiation images have been recorded, obtaining a plurality of image signals representing said radiation images of said object, iv) carrying out a size correcting process on the plurality of said image signals representing said radiation images of said object such that sizes of said radiation images of said object represented by the plurality of said image signals may become identical with one another, and v) carrying out subtracting operations on image signals, which are obtained from said size correcting process.

The third energy subtraction processing method for radiation images in accordance with the present invention may be carried out with an apparatus described below.

Specifically, the present invention still further provides a third energy subtraction processing apparatus for radiation images, which comprises:

i) a recording unit comprising:
  a) a radiation source which produces radiation comprising radiation components having energy levels covering a predetermined energy range,
  b) an object locating section in which an object is located, and
  c) a sheet supporting section which is located facing said radiation source with said object locating section intervening between said sheet supporting section and said radiation source, and in which a recording medium capable of recording a plurality of radiation images during its exposure to radiation with different energy distributions is located, ii) a read-out unit for obtaining a plurality of image signals representing a plurality of radiation images of said object from said recording medium, on which said radiation images of said object have been recorded in said recording unit, and iii) an operation unit comprising:
  a) a size correcting operation means for carrying out a size correcting process on the plurality of said image signals representing the plurality of said radiation images of said object such that sizes of said radiation images of said object represented by the plurality of said image signals may become identical with one another, and
  b) a subtracting operation means for carrying out subtracting operations on image signals, which are obtained from said size correcting process.

The fourth energy subtraction processing method for radiation images in accordance with the present invention may be carried out with an apparatus described below.

Specifically, the present invention also provides a fourth energy subtraction processing apparatus for radiation images, which comprises:

i) a recording unit comprising:
  a) a radiation source which produces radiation comprising radiation components having energy levels covering a predetermined energy range,
  b) an object locating section in which an object is located, and
  c) a sheet supporting section which is located facing said radiation source with said object locating section intervening between said sheet supporting section and said radiation source, and in which a plurality of recording media are located simultaneously, each of said recording media being capable of recording one of a plurality of radiation images during its exposure to radiation with different energy distributions, ii) a read-out unit for obtaining a plurality of image signals representing the radiation images of said object from the plurality of said recording media, on which said radiation images of said object have been recorded in said recording unit, and iii) an operation unit comprising:
  a) a size correcting operation means for carrying out a size correcting process on the plurality of said image signals representing said radiation images of said object such that sizes of said radiation images of said object represented by the plurality of said image signals may become identical with one another, and
  b) a subtracting operation means for carrying out subtracting operations on image signals, which are obtained from said size correcting process.

In the third energy subtraction processing method for radiation images and the third energy subtraction processing apparatus for radiation images in accordance with the present invention, a single recording medium is utilized which is capable of recording a plurality of radiation images during its exposure to radiation with different energy distributions. By way of example, the recording medium may be constituted in one of various ways described above with respect to the first energy subtraction processing method for radiation images and the first energy subtraction processing apparatus for radiation images in accordance with the present invention.

In the fourth energy subtraction processing method for radiation images and the fourth energy subtraction processing apparatus for radiation images in accordance with the present invention, a plurality of recording media are utilized, each of which is capable of recording one of a plurality of radiation images during its exposure to radiation with different energy distributions.

With the third and fourth energy subtraction processing methods for radiation images and the third and fourth energy subtraction processing apparatuses for radiation images in accordance with the present invention, the method proposed in U.S. Pat. No. 4,855,598, with which energy subtraction processing is carried out with a single recording operation, is employed and improved such that the image quality of peripheral parts of the subtraction image, which is obtained from the subtraction processing, is prevented from becoming worse than the image quality of the center part of the subtraction image.

It was found that, for the reason described below, the problems occur in that the image quality of peripheral parts of the subtraction image becomes worse than the image quality of the center part of the subtraction image. Specifically, a plurality of the radiation images, which are to be subjected to the subtraction processing, are recorded at positions spaced different lengths of distances from the radiation source and the object. As a result, the magnification varies for different radiation images. When subtraction processing is carried out on the image signals representing the radiation images and a subtraction image is obtained from the subtraction processing, an artifact occurs due to the difference in the magnification, particularly at the peripheral parts of the subtraction image.

With the third and fourth energy subtraction processing methods for radiation images and the third and fourth energy subtraction processing apparatuses for radiation images in accordance with the present invention, a size correcting process is carried out on the plurality of the image signals representing the plurality of the radiation images of the object such that sizes of the radiation images may become identical with one another. Subtracting operations are then carried out on image signals, which are obtained from the size correcting process. Therefore, the image quality of peripheral parts of the subtraction image, which is obtained from the subtraction processing, can be kept as good as the image quality of the center part of the subtraction image. Accordingly, a subtraction image having good image quality can be obtained.

Also, with the third and fourth energy subtraction processing methods for radiation images and the third and fourth energy subtraction processing apparatuses for radiation images in accordance with the present invention, the energy subtraction processing is carried out with a single recording operation as in the method proposed in U.S. Pat. No. 4,855,598. Therefore, no problem occurs in that the radiation images do not coincide with one another due to movement of the object during the operation for recording the radiation images and a motion artifact occurs in the subtraction image, which is obtained from the subtraction processing.

The present invention further provides a superposition processing method for radiation images, which comprises the steps of:

i) irradiating radiation, which has been produced by a radiation source, to an object, ii) irradiating the radiation, which has passed through said object, simultaneously to a plurality of recording media, each of which is capable of recording one of a plurality of radiation images during its exposure to radiation, whereby the radiation images of said object are recorded on the plurality of said recording media, iii) from the plurality of said recording media on which said radiation images have been recorded, obtaining a plurality of image signals representing said radiation images of said object, iv) carrying out a size correcting process on the plurality of said image signals representing said radiation images of said object such that sizes of said radiation images of said object represented by the plurality of said image signals may become identical with one another, and v) carrying out superposing operations on image signals, which are obtained from said size correcting process.

The present invention still further provides a superposition processing apparatus for radiation images, which comprises:

i) a recording unit comprising:
  a) a radiation source which produces radiation,
  b) an object locating section in which an object is located, and
  c) a sheet supporting section which is located facing said radiation source with said object locating section intervening between said sheet supporting section and said radiation source, and in which a plurality of recording media are located simultaneously, each of said recording media being capable of recording one of a plurality of radiation images during its exposure to radiation, ii) a read-out unit for obtaining a plurality of image signals representing the radiation images of said object from the plurality of said recording media, on which said radiation images of said object have been recorded in said recording unit, and iii) an operation unit comprising:
  a) a size correcting operation means for carrying out a size correcting process on the plurality of said image signals representing said radiation images of said object such that sizes of said radiation images of said object represented by the plurality of said image signals may become identical with one another, and
  b) a superposing operation means for carrying out superposing operations on image signals, which are obtained from said size correcting process.

In the superposition processing method and apparatus for radiation images in accordance with the present invention, a plurality of recording media are utilized, each of which is capable of recording one of a plurality of radiation images during its exposure to radiation. The plurality of the recording media may be separate from one another or may be combined with one another. For example, as the plurality of the recording media, a single recording medium may be employed which is composed of a plurality of recording layers, each of which is capable of recording one of a plurality of radiation images during its exposure to radiation.

It was found that, for the reason described below, the problems occur in that the image quality of peripheral parts of the superposition image, which is obtained from the superposition processing, becomes worse than the image quality of the center part of the superposition image. Specifically, a plurality of the radiation images, which are to be subjected to the superposition processing, are recorded at positions spaced different lengths of distances from the radiation source and the object. As a result, the magnification varies for different radiation images. When superposition processing is carried out on the image signals representing the radiation images and a superposition image is obtained from the superposition processing, an artifact occurs due to the difference in the magnification, particularly at the peripheral parts of the superposition image.

With the superposition processing method and apparatus for radiation images in accordance with the present invention, a size correcting process is carried out on the plurality of the image signals representing the plurality of the radiation images of the object such that sizes of the radiation images may become identical with one another. Superposing operations are then carried out on image signals, which are obtained from the size correcting process. Therefore, the image quality of peripheral parts of the superposition image, which is obtained from the superposition processing, can be kept as good as the image quality of the center part of the superposition image. Accordingly, a superposition image having good image quality can be obtained.

The present invention also provides a radiation image read-out apparatus wherein, after radiation images have been stored on two stimulable phosphor sheets with an image recording operation, in which the two stimulable phosphor sheets are located in parallel and in a relation spaced a distance d from each other and are then exposed to radiation, which has been produced by a radiation source and which has passed through an object, the radiation images are read out from the two stimulable phosphor sheets with an image read-out operation, in which each of the two stimulable phosphor sheets is two-dimensionally scanned with stimulating rays, which cause it to emit light in proportion to the amount of energy stored thereon during its exposure to the radiation, and the emitted light is detected, wherein the improvement comprises the provision of a means for setting the speeds, at which two said stimulable phosphor sheets are scanned two-dimensionally, such that the speed, at which one of two said stimulable phosphor sheets that was located remote from said radiation source during said image recording operation is scanned two-dimensionally, is $$\left(1 + \frac{d}{D}\right)$$

times the speed, at which the other stimulable phosphor sheet that was located close to said radiation source during said image recording operation is scanned two-dimensionally, where D denotes the distance between said radiation source and said other stimulable phosphor sheet that was located close to said radiation source during said image recording operation.

Specifically, with the radiation image read-out apparatus in accordance with the present invention, the speed, at which a stimulable phosphor sheet is scanned in a sub-scanning direction, is set by adjusting the speed, at which the stimulable phosphor sheet is conveyed, and the speed, at which a stimulable phosphor sheet is scanned in a main scanning direction, is set by adjusting the intervals of sampling during the detection of the light emitted by the stimulable phosphor sheet.

In the radiation image read-out apparatus in accordance with the present invention, the speed, at which one of the two stimulable phosphor sheets that was located remote from the radiation source during the image recording operation is scanned two-dimensionally, is set such that said speed is $$\left(1 + \frac{d}{D}\right)$$

times the speed, at which the other stimulable phosphor sheet that was located close to the radiation source during the image recording operation is scanned two-dimensionally. This is equivalent to the setting such that the speed, at which the stimulable phosphor sheet that was located close to the radiation source during the image recording operation is scanned two-dimensionally, is $$1 / \left(1 + \frac{d}{D}\right)$$

times, i.e.

$$\left(1 - \frac{d}{D + d}\right)$$

times, the speed, at which the stimulable phosphor sheet that was located remote from the radiation source during the image recording operation is scanned two-dimensionally. Therefore, when the speed, at which the stimulable phosphor sheet that was located close to the radiation source during the image recording operation is scanned two-dimensionally, is taken as being 1, the speed, at which the stimulable phosphor sheet that was located remote from the radiation source during the image recording operation is scanned two-dimensionally, may be set to $$\left(1 + \frac{d}{D}\right).$$

Alternatively, when the speed, at which the stimulable phosphor sheet that was located remote from the radiation source during the image recording operation is scanned two-dimensionally, is taken as being 1, the speed, at which the stimulable phosphor sheet that was located close to the radiation source during the image recording operation is scanned two-dimensionally, may be set to $$1 - \frac{d}{D + d}.$$

In the radiation image read-out apparatus in accordance with the present invention, only a single stimulable phosphor sheet may be employed which can serve as the two stimulable phosphor sheets. Specifically, as described above with respect to the recording medium employed in the first energy subtraction processing method for radiation images and the first energy subtraction processing apparatus for radiation images in accordance with the present invention, a single stimulable phosphor sheet may be utilized which is capable of recording a plurality of radiation images during its exposure to radiation with different energy distributions.

The radiation image read-out apparatus in accordance with the present invention eliminates the drawbacks of the superposition processing method as disclosed in, for example, U.S. patent application Ser. No. 168,800, now U.S. Pat. No. 4,356,398 and the method proposed in U.S. Pat. No. 4,855,598, with which energy subtraction processing is carried out with a single recording operation. Specifically, with the radiation image read-out apparatus in accordance with the present invention, the problems can be prevented from occurring in that the image quality of peripheral parts of a subtraction image or a superposition image becomes worse than the image quality of the center part of the subtraction image or the superposition image.

With the radiation image read-out apparatus in accordance with the present invention, the radiation images are read out from the stimulable phosphor sheets and image signals representing the radiation images are obtained such that sizes of the radiation images represented by the image signals may become identical with each other. Specifically, a size correction process is effected when the radiation images are read out from the stimulable phosphor sheets. Subtracting operations or superposing operations can then be carried out on image signals, which are obtained from the size correcting process. Therefore, the image quality of peripheral parts of the subtraction image or the superposition image can be kept as good as the image quality of the center part of the subtraction image or the superposition image. Accordingly, a subtraction image or a superposition image having good image quality can be obtained.

DESCRIPTION OF THE PREFERRED EMBODIMENTS

The present invention will hereinbelow be described in further detail with reference to the accompanying drawings.

Figure 1:
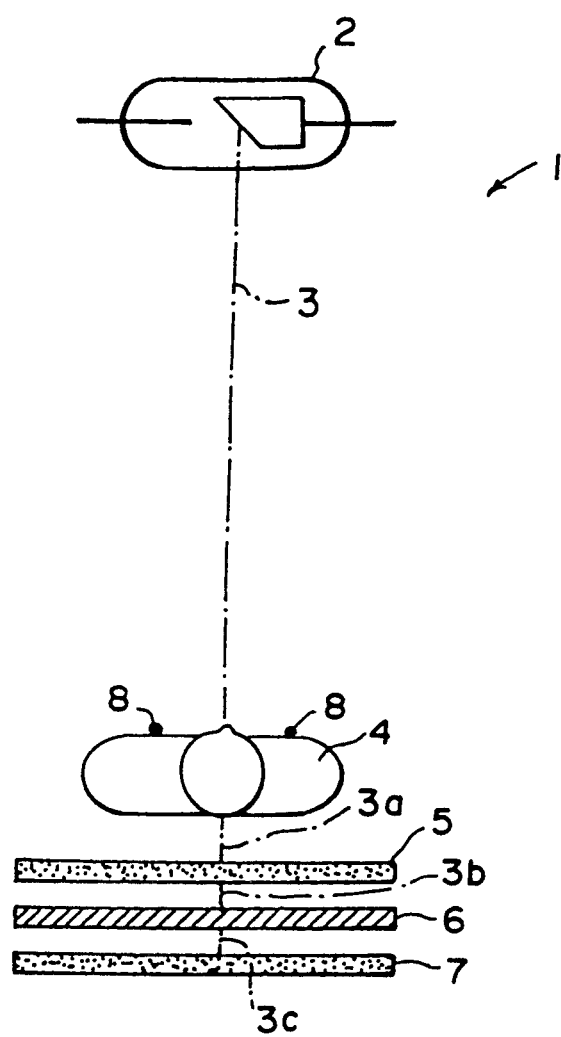
FIG. 1 is a schematic view showing an X-ray image recording apparatus, which serves as a recording unit in an embodiment of the second energy subtraction processing apparatus for radiation images in accordance with the present invention.

FIG. 1 is a schematic view showing an X-ray image recording apparatus 1, which serves as a recording unit in an embodiment of the second energy subtraction processing apparatus for radiation images in accordance with the present invention.

With reference to FIG. 1, X-rays 3 are produced by an X-ray tube 2 of the X-ray image recording apparatus 1 and irradiated to an object 4. X-rays 3a, which have passed through the object 4, impinge upon a first stimulable phosphor sheet 5, and part of energy of the X-rays 3a is stored on the first stimulable phosphor sheet 5. In this manner, an X-ray image of the object 4 is stored on the first stimulable phosphor sheet 5. X-rays 3b, which have passed through the first stimulable phosphor sheet 5, then pass through a filter 6. X-rays 3c, which have passed through the filter 6, impinge upon a second stimulable phosphor sheet 7. In this manner, an X-ray image of the object 4 is stored on the second stimulable phosphor sheet 7. During the image recording operation, marks 8, 8 are placed on the object 4.

Figure 2:
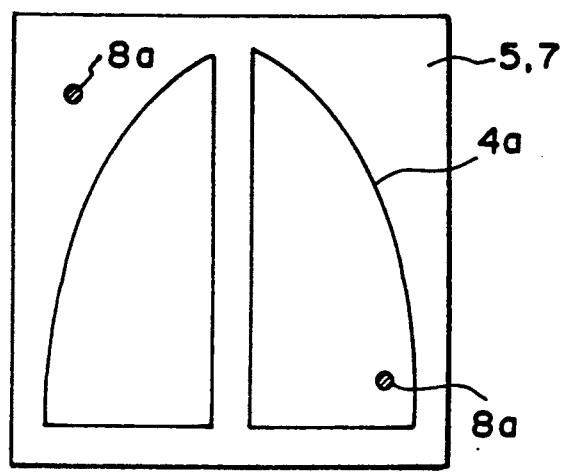
FIG. 2 is an explanatory view showing X-ray images stored on stimulable phosphor sheets.

FIG. 2 is an explanatory view showing the X-ray images stored on the first stimulable phosphor sheet 5 and the second stimulable phosphor sheet 7.

With reference to FIG. 2, an X-ray image 4a of the object 4 is stored approximately over the whole surface of each of the first stimulable phosphor sheet 5 and the second stimulable phosphor sheet 7. Images 8a, 8a of the marks 8, 8 are also stored together with the X-ray image 4a on each of the first stimulable phosphor sheet 5 and the second stimulable phosphor sheet 7. (As an aid in facilitating the explanation, the mark images 8a, 8a will hereinafter be also referred to as the marks.) The marks 8a, 8a are stored at the same positions on the first stimulable phosphor sheet 5 and the second stimulable phosphor sheet 7. After image signals are detected from the first stimulable phosphor sheet 5 and the second stimulable phosphor sheet 7 in the manner described later, the positions of the X-ray images 4a, 4a stored on the two sheets 5 and 7 are adjusted in accordance with the marks 8a, 8a so that the X-ray images 4a, 4a coincide with each other.

Figure 3:
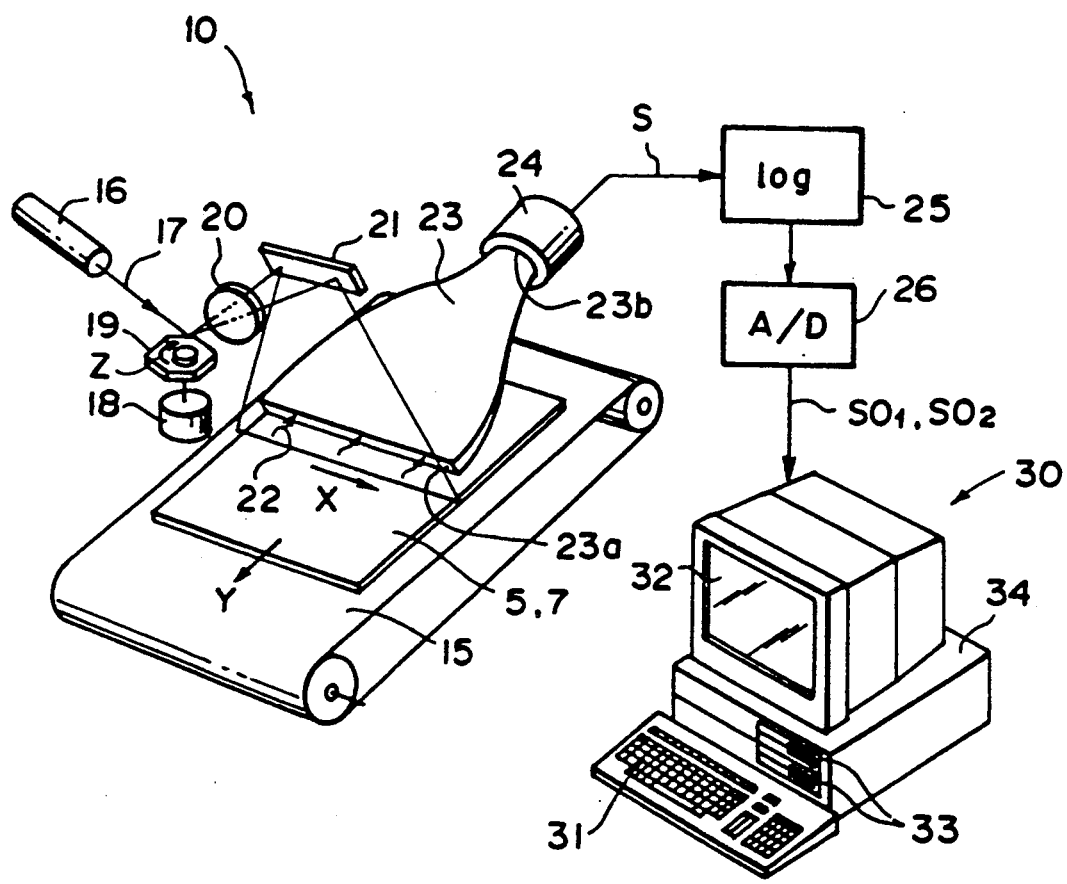
FIG. 3 is a perspective view showing an X-ray image read-out apparatus and an image processing and displaying apparatus, which serve as a read-out unit and an operation unit in the embodiment of the second energy subtraction processing apparatus for radiation images in accordance with the present invention.

FIG. 3 is a perspective view showing an X-ray image read-out apparatus 10 and an image processing and displaying apparatus 30, which serve as a read-out unit and an operation unit in the embodiment of the second energy subtraction processing apparatus for radiation images in accordance with the present invention.

After the first X-ray image and the second X-ray image have been stored respectively on the first stimulable phosphor sheet 5 and the second stimulable phosphor sheet 7 in the X-ray image recording apparatus 1 shown in FIG. 1, the first stimulable phosphor sheet 5 and the second stimulable phosphor sheet 7 are placed one after another at a predetermined position in the X-ray image read-out apparatus 10 shown in FIG. 3. How the first X-ray image is read out from the first stimulable phosphor sheet 5 will be described hereinbelow.

With reference to FIG. 3, the first stimulable phosphor sheet 5 is conveyed in a sub-scanning direction indicated by the arrow Y by a sheet conveyance means 15, which is constituted of an endless belt or the like and which is operated by an operating means (not shown). A laser beam 17, which serves as stimulating rays, is produced by a laser beam source 16. The laser beam 17 is reflected and deflected by a rotating polygon mirror 19, which is being quickly rotated by a motor 18 in the direction indicated by the arrow Z. The laser beam 17 then passes through a converging lens 20, which is constituted of an fθ lens or the like. The direction of the optical path of the laser beam 17 is then changed by a mirror 21, and the laser beam 17 is caused to impinge upon the first stimulable phosphor sheet 5 and scan it in a main scanning direction indicated by the arrow X. The main scanning direction is approximately normal to the sub-scanning direction indicated by the arrow Y. When the first stimulable phosphor sheet 5 is exposed to the laser beam 17, the exposed portion of the first stimulable phosphor sheet 5 emits light 22 in an amount proportional to the amount of energy stored thereon during its exposure to the X-rays. The emitted light 22 is guided by a light guide member 23, and photoelectrically detected by a photomultiplier 24. The light guide member 23 is made from a light guiding material, such as an acrylic plate. The light guide member 23 has a linear light input face 23a, positioned to extend along the main scanning line on the first stimulable phosphor sheet 5, and a ring-shaped light output face 23b, positioned so that it is in close contact with a light receiving face of the photomultiplier 24. The emitted light 22, which has entered the light guide member 23 from its light input face 23a, is guided through repeated total reflection inside of the light guide member 23, emanates from the light output face 23b, and is received by the photomultiplier 24. In this manner, the amount of the emitted light 22, which amount represents the first X-ray image stored on the first stimulable phosphor sheet 5, is converted into an electric signal by the photomultiplier 24.

An analog signal S generated by the photomultiplier 24 is logarithmically amplified by a logarithmic amplifier 25, and fed into an A/D converter 26. The A/D converter 26 samples the analog signal S, and the sampled signal is converted into a digital image signal SO. The image signal SO thus obtained represents the first X-ray image, which was stored on the first stimulable phosphor sheet 5, and will hereafter be referred to as the first image signal SO1. The first image signal SO1 is stored in an internal memory of the image processing and displaying apparatus 30.

The image processing and displaying apparatus 30 is provided with a keyboard 31, from which various instructions are entered, and a CRT display device 32, which displays auxiliary information for instructions and a visible image represented by an image signal. The image processing and displaying apparatus 30 is also provided with a floppy disk drive unit 33, which receives and operates a floppy disk serving as an auxiliary storage medium, and a main body 34 which incorporates a CPU and the internal memory.

Thereafter, in the same manner as that described above, a second image signal SO2 is obtained which represents the second X-ray image stored on the second stimulable phosphor sheet 7. The second image signal SO2 is stored in the internal memory of the image processing and displaying apparatus 30.

In the manner described above, the two image signals SO1 and SO2, on which subtraction processing is to be carried out, are stored in the internal memory. Thereafter, the second image signal SO2 is read from the internal memory, and the MTF of the X-ray image represented by the second image signal SO2 is corrected. The correction of the MTF is carried out by the main body 34 provided with the CPU, or the like. The combination of the hardware function and the software function for correcting the MTF constitutes an example of the MTF correcting operation means of the second energy subtraction processing apparatus for radiation images in accordance with the present invention.

Figure 4:
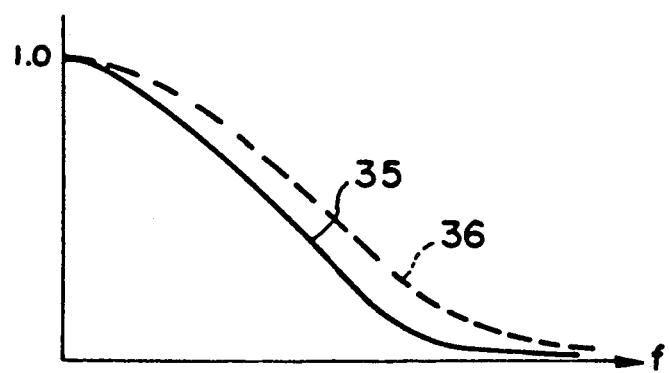
FIG. 4 is a graph showing examples of MTF's of X-ray images.

FIG. 4 is a graph showing examples of the MTF's of the X-ray images. The horizontal axis represents the spatial frequency f, and the vertical axis represents the response to the spatial frequency f. Curve 35 indicated by the solid line represents the MTF of the X-ray image which is represented by the second image signal SO2, and curve 36 indicated by the broken line represents the MTF of the X-ray image which is represented by the first image signal SO1.

It is desirable that the MTF of the X-ray image represented by the second image signal SO2 be identical with the MTF of the X-ray image represented by the first image signal SO1. However, the X-ray image represented by the second image signal SO2 was stored on the second stimulable phosphor sheet 7, which was further from the radiation source 2 than was the first stimulable phosphor sheet 5. The X-rays 3c, which impinged upon the second stimulable phosphor sheet 7, contained X-rays scattered by the first stimulable phosphor sheet 5 and the filter 6. Therefore, the frequency response deteriorates in the high frequency region, and the X-ray image represented by the second image signal SO2 has the MTF indicated by curve 35 in FIG. 4. Accordingly, frequency response processing is carried out on the second image signal SO2 such that the MTF becomes as indicated by curve 36. Curve 36 may be determined in advance from statistical analyses of many X-ray images.

In this embodiment, an unsharp mask processing technique as proposed in, for example, Japanese Patent Publication No. 62(1987)-62373, U.S. patent application Ser. No. 259,814 is employed as the frequency response processing. With the unsharp mask processing technique, the mean value is calculated from the values of image signal components of the original image signal SO2 representing the picture elements, which fall within a predetermined range around every picture element in the X-ray image. In this manner, an unsharp mask signal Sus representing the mean value is obtained. Thereafter, the unsharp mask signal Sus is subtracted from the original image signal SO2, the remainder thus obtained is multiplied by a predetermined coefficient β, and the product thus obtained is added to and subtracted from the original image signal SO2. In this manner, an image signal SO2' is obtained from the frequency response processing. The calculations are represented by the formula $$SO2' = SO2 \pm \beta \cdot (SO2 - Sus) \qquad (1)$$

The MTF of the X-ray image can be corrected by processing the image signal components representing the respective picture elements in the X-ray image.

Alternatively, the image signal SO2' may be obtained from the MTF correcting operations wherein Fourier transformation is carried out on the image signal SO2, the signal obtained from the Fourier transformation is subjected to a filtering operation, and thereafter inverse Fourier transformation is carried out.

In the embodiment described above, the MTF of the X-ray image represented by the second image signal SO2 is corrected. Alternatively, the MTF of the X-ray image represented by the first image signal SO1 may be corrected such that it becomes identical with the MTF of the X-ray image represented by the second image signal SO2.

After the image signal SO2′ is obtained from the MTF correcting process described above, position adjustment processing is carried out on the image signal SO1 and the image signal SO2′ such that the positions of the X-ray images represented by the image signal SO1 and the image signal SO2′ may coincide with each other. For this purpose, a method disclosed in, for example, U.S. Pat. No. 4,710,875 may be employed. With the position adjustment processing, one of the two X-ray images is linearly moved or rotated with respect to the other X-ray image until the marks 8a, 8a in one X-ray image, which are shown in FIG. 2, overlap the marks 8a, 8a in the other X-ray image.

Thereafter, subtraction processing is carried out on the image signals SO1 and SO2′. Specifically, the image signals SO1 and SO2′ are weighted, and the image signal components of the weighted image signals are subtracted from each other which represent the image information stored at corresponding picture elements in the two X-ray images. Thus an image signal S1 is obtained, which can be expressed as $$S1 = Wa \cdot SO1 - Wb \cdot SO2' + C$$

where Wa and Wb each denote a weighting coefficient, and C denotes a bias component. The image signal S1 represents an image corresponding to the difference between the first X-ray image, which is represented by the image signal SO1 and which was stored from the low-energy components of the X-rays, and the second X-ray image, which is represented by the image signal SO2′ and which was stored from the high-energy components of the X-rays. The image signal S1 is fed from the main body 34 into the CRT display device 32 of the image processing and displaying apparatus 30. The CRT display device 32 reproduces a visible image (an energy subtraction image) from the image signal S1 and displays it. The functions of the main body 34 for carrying out the subtraction processing (the combination of the hardware and software functions) constitute an example of the subtracting operation means of the second energy subtraction processing apparatus for radiation images in accordance with the present invention.

In the aforesaid embodiment of the second energy subtraction processing apparatus for radiation images in accordance with the present invention, the two X-ray images are recorded with a single recording operation on the two stimulable phosphor sheets. Alternatively, X-ray images may be recorded sequentially on a plurality of stimulable phosphor sheets. As another alternative, instead of the plurality of stimulable phosphor sheets being used, only a single stimulable phosphor sheet may be utilized which is composed of a plurality of stimulable phosphor layers. As a further alternative, a stimulable phosphor sheet composed of a single stimulable phosphor layer may be utilized, and X-ray images may be recorded at parts in the vicinity of the front surface and the rear surface of the stimulable phosphor layer.

Also, in the embodiment described above, stimulable phosphor sheets are used. However, the second energy subtraction processing apparatus for radiation images in accordance with the present invention is also applicable when other recording media, such as X-ray film (ordinarily combined with intensifying screens), are used.

An embodiment of the fourth energy subtraction processing apparatus for radiation images in accordance with the present invention will be described hereinbelow.

Figure 5:
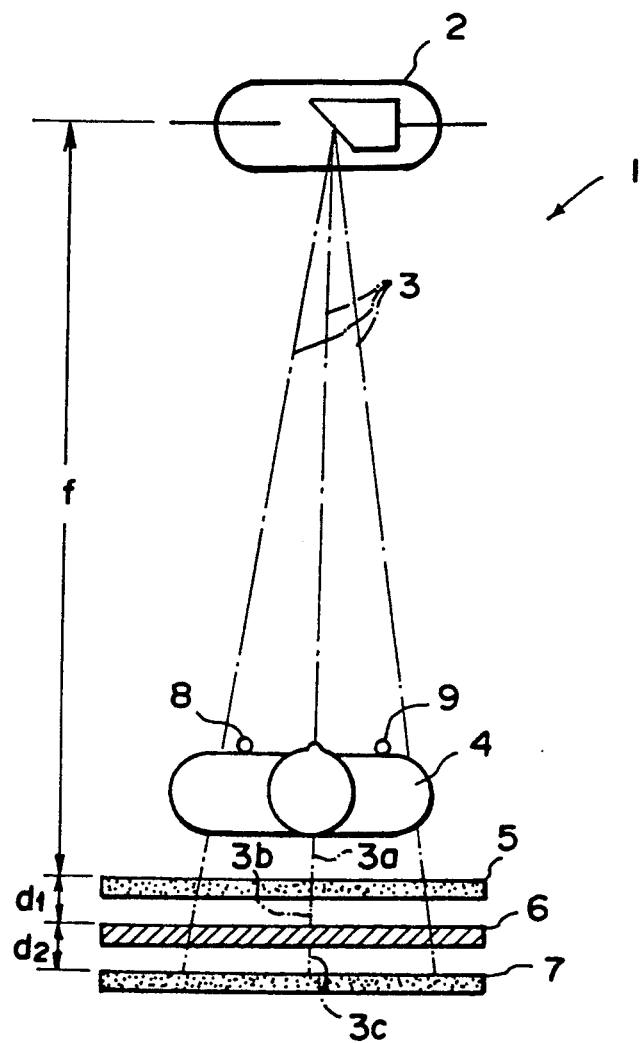
FIG. 5 is a schematic view showing an X-ray image recording apparatus, which serves as a recording unit in an embodiment of the fourth energy subtraction processing apparatus for radiation images in accordance with the present invention.

FIG. 5 is a schematic view showing an X-ray image recording apparatus 1, which serves as a recording unit in an embodiment of the fourth energy subtraction processing apparatus for radiation images in accordance with the present invention. In FIG. 5, similar elements are numbered with the same reference numerals with respect to FIG. 1. First and second X-ray images are recorded on the first stimulable phosphor sheet 5 and the second stimulable phosphor sheet 7 in the same manner as that described above. During the image recording operation, marks 8 and 9 are placed on the object 4.

Figure 6:
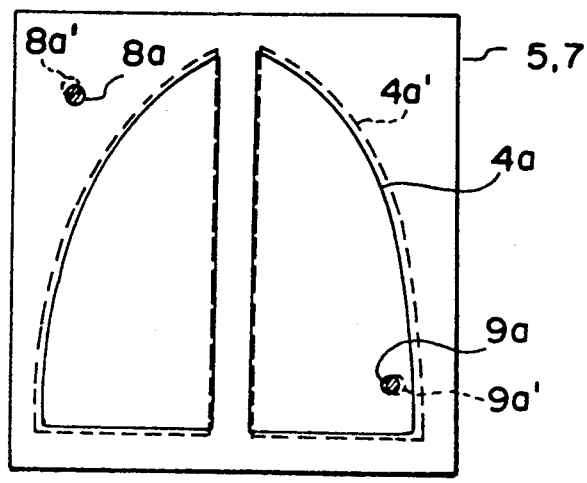
FIG. 6 is an explanatory view showing X-ray images stored on stimulable phosphor sheets.

FIG. 6 is an explanatory view showing the X-ray images stored on the first stimulable phosphor sheet 5 and the second stimulable phosphor sheet 7.

With reference to FIG. 6, X-ray images 4a and 4a′ of the object 4 are stored approximately over the whole surfaces of the first stimulable phosphor sheet 5 and the second stimulable phosphor sheet 7. Images 8a and 9a of the marks 8 and 9 are stored together with the X-ray image 4a on the first stimulable phosphor sheet 5. Also, images 8a′ and 9a′ of the marks 8 and 9 are stored together with the X-ray image 4a′ on the second stimulable phosphor sheet 7. (As an aid in facilitating the explanation, the mark images 8a and 9a and the mark images 8a′ and 9a′ will hereinafter be also referred to as the marks.) The marks 8a and 9a and the marks 8a′ and 9a′ are stored at the corresponding positions on the first stimulable phosphor sheet 5 and the second stimulable phosphor sheet 7. After image signals are detected from the first stimulable phosphor sheet 5 and the second stimulable phosphor sheet 7, the positions of the X-ray images 4a and 4a′ stored on the two sheets 5 and 7 are adjusted in accordance with the marks 8a and 9a and the marks 8a′ and 9a′ so that the X-ray images 4a and 4a′ coincide with each other.

However, as shown in FIG. 5, the distances from the X-ray tube 2 and the object 4 to the first stimulable phosphor sheet 5 and the distances from the X-ray tube 2 and the object 4 to the second stimulable phosphor sheet 7 are different from each other. Therefore, the magnifications of the X-ray images 4a and 4a′ stored on the first stimulable phosphor sheet 5 and the second stimulable phosphor sheet 7 are different from each other. Also, the positions of the marks 8a and 9a stored on the first stimulable phosphor sheet 5 are different from the positions of the marks 8a′ and 9a′ stored on the second stimulable phosphor sheet 7. The deviation in position between the corresponding image parts, which causes an artifact to occur in a subtraction image, occurs to a large extent at peripheral parts of the images due to different magnifications of the images.

After the first X-ray image and the second X-ray image have been stored respectively on the first stimulable phosphor sheet 5 and the second stimulable phosphor sheet 7 in the X-ray image recording apparatus 1 shown in FIG. 5, the X-ray images are read out from the sheets 5 and 7 in the X-ray image read-out apparatus 10 shown in FIG. 3 in the same manner as that described above. The first image signal SO1 and the second image signal SO2 thus obtained are stored in the internal memory of the image processing and displaying apparatus 30 shown in FIG. 3. In this embodiment, the X-ray image read-out apparatus 10 and the image processing and displaying apparatus 30 serve as a read-out unit and an operation unit in the embodiment of the fourth energy subtraction processing apparatus for radiation images in accordance with the present invention.

After the two image signals SO1 and SO2, on which subtraction processing is to be carried out, are stored in the internal memory, they are read therefrom. Size correcting operations are then carried out on the two image signals SO1 and SO2 such that the sizes of the X-ray images represented by the two image signals SO1 and SO2 become identical with each other. The size correcting operations are carried out by the main body 34 provided with the CPU, or the like. The combination of the hardware function and the software function for correcting the image sizes constitutes an example of the size correcting operation means of the fourth energy subtraction processing apparatus for radiation images in accordance with the present invention.

How the size correcting operations and position adjusting operations for the two X-ray images represented by the first image signal SO1 and the second image signal SO2 are carried out will be described hereinbelow. In this embodiment, the operations for adjusting the positions are employed which are disclosed in Japanese Unexamined Patent Publication No. 58(1983)-163338.

The marks 8a and 9a in the first X-ray image represented by the first image signal SO1 respectively have coordinates $(X_{A1}, Y_{A1})$ and coordinates $(X_{A2}, Y_{A2})$. Also, the marks 8a' and 9a' in the second X-ray image represented by the second image signal SO2 respectively have coordinates $(X_{B1}, Y_{B1})$ and coordinates $(X_{B2}, Y_{B2})$.

In this case, the magnification, $\alpha$, of the second X-ray image with respect to the first X-ray image is represented by the formula $$\alpha = \sqrt{\frac{(X_{B2} - X_{B1})^2 + (Y_{B2} - Y_{B1})^2}{(X_{A2} - X_{A1})^2 + (Y_{A2} - Y_{A1})^2}} \quad (2)$$

The size correction is carried out by multiplying the first X-ray image by $\alpha$.

Also, the following formula obtains:

$$\theta = \tan^{-1}\left(\frac{(Y_{B2} - Y_{B1})}{(X_{B2} - X_{B1})}\right) - \tan^{-1}\left(\frac{(Y_{A2} - Y_{A1})}{(X_{A2} - X_{A1})}\right) \quad (3)$$

where denotes the angle of rotation between the two X-ray images, i.e. the angle between the line, which connects the coordinates $(X_{A1}, Y_{A1})$ and the coordinates $(X_{A2}, Y_{A2})$, and the line, which connects the coordinates $(X_{B1}, Y_{B1})$ and the coordinates $(X_{B2}, Y_{B2})$. The positions of the two X-ray images can be caused to coincide with each other by rotating the first X-ray image by the angle $\theta$.

A shift $\Delta X1$ along the x direction between the marks 8a and 8a' in the two X-ray images and a shift $\Delta Y1$ along the y direction between the marks 8a and 8a' in the two X-ray images are expressed as $$\Delta X_1 = X_{B1} - \{\alpha \cdot (X_{A1} - C_X) \cdot \cos\theta - \alpha(Y_{A1} - C_Y) \cdot \sin\theta + C_X\} \quad (4)$$

$$\Delta Y_1 = Y_{B1} - \{\alpha \cdot (X_{A1} - C_X) \cdot \sin\theta + \alpha(Y_{A1} - C_Y) \cdot \cos\theta + C_Y\} \quad (5)$$

Also, a shift $\Delta X2$ along the x direction between the marks 9a and 9a' in the two X-ray images and a shift $\Delta Y2$ along the y direction between the marks 9a and 9a' in the two X-ray images are expressed as $$\Delta X_2 = X_{B2} - \{\alpha \cdot (X_{A2} - C_X) \cdot \cos\theta - \alpha(Y_{A2} - C_Y) \cdot \sin\theta + C_X\} \quad (6)$$

$$\Delta Y_2 = Y_{B2} - \{\alpha \cdot (X_{A2} - C_X) \cdot \sin\theta + \alpha(Y_{A2} - C_Y) \cdot \cos\theta + C_Y\} \quad (7)$$

In Formulas (4) through (7), CX and CY respectively denote the X and Y coordinates of the center of rotation.

In ideal cases, $\Delta X1$ and $\Delta X2$ will be equal to each other. Also, $\Delta Y1$ and $\Delta Y2$ will be equal to each other. However, in some cases, they will not be equal to each other because of errors in sampling of the image signals SO1 and SO2. Therefore, position adjustment amounts $\Delta X$ and $\Delta Y$ along the X and Y directions are calculated from the formulas $$\Delta X = (\Delta X_1 + \Delta X_2)/2 \quad (8)$$

$$\Delta Y = (\Delta Y_1 + \Delta Y_2)/2 \quad (9)$$

The amounts thus calculated are used during the adjustment of the position of the first X-ray image along the X and Y directions.

In the manner described above, the magnification correcting operations are carried out for the two X-ray images, and a first image signal SO1' and a second image signal SO2', which respectively correspond to the image signals SO1 and SO2, are obtained from the magnification correcting operations. Thereafter, subtraction processing is carried out on the image signals SO1' and SO2'. Specifically, the image signals SO1' and SO2' are weighted, and the image signal components of the weighted image signals are subtracted from each other which represent the image information stored at corresponding picture elements in the two X-ray images. Thus an image signal S1 is obtained, which can be expressed as $$S1 = W_a \cdot SO1' - W_b \cdot SO2' + C \quad (10)$$

where Wa and Wb each denote a weighting coefficient, and C denotes a bias component. The image signal S1 represents an image corresponding to the difference between the two X-ray images. The image signal S1 is fed from the main body 34 into the CRT display device 32 of the image processing and displaying apparatus 30. The CRT display device 32 reproduces a visible image (an energy subtraction image) from the image signal S1 and displays it. The functions of the main body 34 for carrying out the subtraction processing (the combination of the hardware and software functions) constitute an example of the subtracting operation means of the fourth energy subtraction processing apparatus for radiation images in accordance with the present invention.

In the aforesaid embodiment of the fourth energy subtraction processing apparatus for radiation images in accordance with the present invention, the magnification is corrected by making the distance between the marks 8a and 9a in the first X-ray image and the distance between the marks 8a' and 9a' in the second X-ray image equal to each other. Alternatively, the geometrical arrangement in the X-ray image recording apparatus shown in FIG. 5 may be utilized during the size correction. Specifically, the magnification, α, is expressed as $$\alpha = \frac{f}{f - d_1 - d_2} \quad (11)$$

wherein, as shown in FIG. 5, f (mm) denotes the focus image distance (FID) during the X-ray image recording operation, d1 (mm) denotes the thickness of the first stimulable phosphor sheet 5, and d2 (mm) denotes the thickness of the filter 6. Therefore, the information about f, d1, and d2 may be entered from the keyboard 31 shown in FIG. 3. The magnification, α, can then be calculated from the entered information. In this manner, the sizes of the two X-ray images can be corrected. In general, d1 and d2 are fixed numbers. In such cases, only the information about f may be entered from the keyboard 31. Alternatively, a means for detecting the position of the X-ray tube 2 during the image recording operation may be located, and the X-ray image recording apparatus 1 shown in FIG. 5 and the image processing and displaying apparatus 30 shown in FIG. 3 may be connected to each other, such that the information about f is automatically entered to the image processing and displaying apparatus 30.

By way of example, in cases where f=1,000 (mm), d1=1 (mm), and d2=1 (mm), the magnification, α, is calculated from Formula (11) as follows:

$$\alpha = \frac{f}{f - d_1 - d_2} = 1.0002 \quad (12)$$

Specifically, if no size correction is carried out, even though the positions of the center parts of the images are adjusted accurately, the positions of image parts will deviate by a length corresponding to two picture elements per 1,000 picture elements in the direction heading away from the center parts of the images. With the fourth energy subtraction processing apparatus for radiation images in accordance with the present invention, such deviation in position can be eliminated, and therefore a subtraction image having good image quality over the whole image can be obtained.

In the aforesaid embodiment of the fourth energy subtraction processing apparatus for radiation images in accordance with the present invention, the two stimulable phosphor sheets are utilized. Alternatively, only a single stimulable phosphor sheet may be utilized which is composed of a plurality of stimulable phosphor layers. As another alternative, a stimulable phosphor sheet composed of a single stimulable phosphor layer may be utilized, and X-ray images may be recorded at parts in the vicinity of the front surface and the rear surface of the stimulable phosphor layer.

Also, in the aforesaid embodiment of the fourth energy subtraction processing apparatus for radiation images in accordance with the present invention, stimulable phosphor sheets are used. However, the fourth energy subtraction processing apparatus for radiation images in accordance with the present invention is also applicable when other recording media, such as X-ray film (ordinarily combined with intensifying screens), are used.

An embodiment of the superposition processing apparatus for radiation images in accordance with the present invention will be described hereinbelow.

Figure 7:
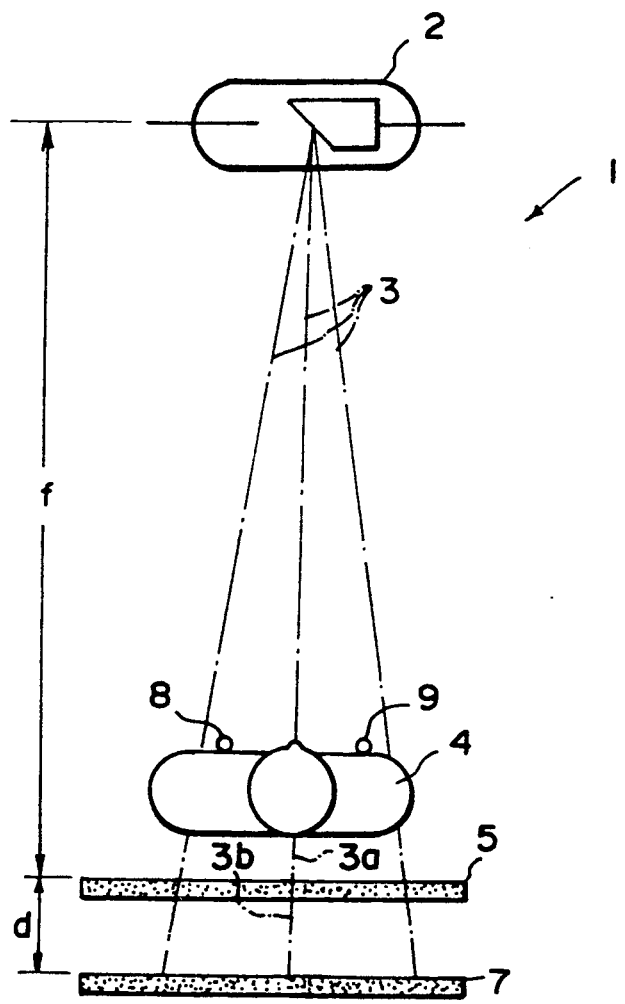
FIG. 7 is a schematic view showing an X-ray image recording apparatus, which serves as a recording unit in an embodiment of the superposition processing apparatus for radiation images in accordance with the present invention.

FIG. 7 is a schematic view showing an X-ray image recording apparatus 1, which serves as a recording unit in an embodiment of the superposition processing apparatus for radiation images in accordance with the present invention.

With reference to FIG. 7, X-rays 3 are produced by an X-ray tube 2 of the X-ray image recording apparatus 1 and irradiated to an object 4. X-rays 3a, which have passed through the object 4, impinge upon a first stimulable phosphor sheet 5, and part of energy of the X-rays 3a is stored on the first stimulable phosphor sheet 5. In this manner, an X-ray image of the object 4 is stored on the first stimulable phosphor sheet 5. X-rays 3b, which have passed through the first stimulable phosphor sheet 5, then impinge upon a second stimulable phosphor sheet 7. In this manner, an X-ray image of the object 4 is stored on the second stimulable phosphor sheet 7. During the image recording operation, marks 8 and 9 are placed on the object 4.

In the manner described above, the X-ray images as shown in FIG. 6 are stored on the first stimulable phosphor sheet 5 and the second stimulable phosphor sheet 7.

Specifically, X-ray images 4a and 4a' of the object 4 are stored approximately over the whole surfaces of the first stimulable phosphor sheet 5 and the second stimulable phosphor sheet 7. Images 8a and 9a of the marks 8 and 9 are stored together with the X-ray image 4a on the first stimulable phosphor sheet 5. Also, images 8a' and 9a' of the marks 8 and 9 are stored together with the X-ray image 4a' on the second stimulable phosphor sheet 7. (As an aid in facilitating the explanation, the mark images 8a and 9a and the mark images 8a' and 9a' will hereinafter be also referred to as the marks.) The marks 8a and 9a and the marks 8a' and 9a' are stored at the corresponding positions on the first stimulable phosphor sheet 5 and the second stimulable phosphor sheet 7. After image signals are detected from the first stimulable phosphor sheet 5 and the second stimulable phosphor sheet 7, the positions of the X-ray images 4a and 4a' stored on the two sheets 5 and 7 are adjusted in accordance with the marks 8a and 9a and the marks 8a' and 9a' so that the X-ray images 4a and 4a' coincide with each other.

However, as shown in FIG. 7, the distances from the X-ray tube 2 and the object 4 to the first stimulable phosphor sheet 5 and the distances from the X-ray tube 2 and the object 4 to the second stimulable phosphor sheet 7 are different from each other. Therefore, the magnifications of the X-ray images 4a and 4a' stored on the first stimulable phosphor sheet 5 and the second stimulable phosphor sheet 7 are different from each other. Also, the positions of the marks 8a and 9a stored on the first stimulable phosphor sheet 5 are different from the positions of the marks 8a' and 9a' stored on the second stimulable phosphor sheet 7. The deviation in position between the corresponding image parts, which causes an artifact to occur in a superposition image, occurs to a large extent at peripheral parts of the images due to different magnifications of the images.

After the first X-ray image and the second X-ray image have been stored respectively on the first stimulable phosphor sheet 5 and the second stimulable phosphor sheet 7 in the X-ray image recording apparatus 1 shown in FIG. 7, the X-ray images are read out from the sheets 5 and 7 in the X-ray image read-out apparatus 10 shown in FIG. 3 in the same manner as that described above. The first image signal SO1 and the second image signal SO2 thus obtained are stored in the internal memory of the image processing and displaying apparatus 30 shown in FIG. 3. In this embodiment, the X-ray image read-out apparatus 10 and the image processing and displaying apparatus 30 serve as a read-out unit and an operation unit in the embodiment of the superposition processing apparatus for radiation images in accordance with the present invention.

After the two image signals SO1 and SO2, on which superposition processing is to be carried out, are stored in the internal memory, they are read therefrom. Size correcting operations are then carried out on the two image signals SO1 and SO2 such that the sizes of the X-ray images represented by the two image signals SO1 and SO2 become identical with each other. The size correcting operations are carried out by the main body 34 provided with the CPU, or the like. The combination of the hardware function and the software function for correcting the image sizes constitutes an example of the size correcting operation means of the superposition processing apparatus for radiation images in accordance with the present invention.

The size correcting operations and the position adjusting operations for the two X-ray images represented by the first image signal SO1 and the second image signal SO2 are carried out in the same manner as that described above for the embodiment of the fourth energy subtraction processing apparatus for radiation images in accordance with the present invention.

In the same manner as that described above, the magnification correcting operations are carried out for the two X-ray images, and a first image signal SO' and a second image signal SO2', which respectively correspond to the image signals SO1 and SO2, are obtained from the magnification correcting operations. Thereafter, superposition processing is carried out on the image signals SO1' and SO2'. Specifically, the image signals SO1' and SO2' are weighted, and the image signal components of the weighted image signals are added to each other which represent the image information stored at corresponding picture elements in the two X-ray images. Thus an image signal S1 is obtained, which can be expressed as $$S1 = Wa \cdot SO1' + Wb \cdot SO2' + C \tag{13}$$

where Wa and Wb each denote a weighting coefficient, and C denotes a bias component. The image signal S1 represents an image corresponding to the sum of the two X-ray images. The image signal S1 is fed from the main body 34 into the CRT display device 32 of the image processing and displaying apparatus 30. The CRT display device 32 reproduces a visible image (a superposition image) from the image signal S1 and displays it. The functions of the main body 34 for carrying out the superposing operations with Formula (13) (the combination of the hardware and software functions) constitute an example of the superposing operation means of the superposition processing apparatus for radiation images in accordance with the present invention.

In the aforesaid embodiment of the superposition processing apparatus for radiation images in accordance with the present invention, the magnification is corrected by making the distance between the marks 8a and 9a in the first X-ray image and the distance between the marks 8a' and 9a' in the second X-ray image equal to each other. Alternatively, the geometrical arrangement in the X-ray image recording apparatus shown in FIG. 7 may be utilized during the size correction. Specifically, the magnification, $\alpha$, is expressed as $$\alpha = \frac{f}{f-d} \tag{14}$$

wherein, as shown in FIG. 7, f (mm) denotes the focus image distance (FID) during the X-ray image recording operation, and d denotes the distance between the first stimulable phosphor sheet 5 and the second stimulable phosphor sheet 7. Therefore, the information about f and d may be entered from the keyboard 31 shown in FIG. 3. The magnification, $\alpha$, can then be calculated from the entered information. In this manner, the sizes of the two X-ray images can be corrected. In general, d is a fixed number. In such cases, only the information about f may be entered from the keyboard 31. Alternatively, a means for detecting the position of the X-ray tube 2 during the image recording operation may be located, and the X-ray image recording apparatus 1 shown in FIG. 7 and the image processing and displaying apparatus 30 shown in FIG. 3 may be connected to each other, such that the information about f is automatically entered to the image processing and displaying apparatus 30.

By way of example, in cases where f=1,000 (mm), and d=1 (mm), the magnification, $\alpha$, is calculated from Formula (14) as follows:

$$\alpha = \frac{f}{f-d} = 1.001 \tag{15}$$

Specifically, if no size correction is carried out, even though the positions of the center parts of the images are adjusted accurately, the positions of image parts will deviate by a length corresponding to a single picture element per 1,000 picture elements in the direction heading away from the center parts of the images. With the superposition processing apparatus for radiation images in accordance with the present invention, such deviation in position can be eliminated, and therefore a superposition image having good image quality over the whole image can be obtained.

In the aforesaid embodiment of the superposition processing apparatus for radiation images in accordance with the present invention, the two stimulable phosphor sheets are utilized. Alternatively, only a single stimulable phosphor sheet may be utilized which is composed of a plurality of stimulable phosphor layers. As another alternative, a stimulable phosphor sheet composed of a single stimulable phosphor layer may be utilized, and X-ray images may be recorded at parts in the vicinity of the front surface and the rear surface of the stimulable phosphor layer.

Also, in the aforesaid embodiment of the superposition processing apparatus for radiation images in accordance with the present invention, stimulable phosphor sheets are used. However, the superposition processing apparatus for radiation images in accordance with the present invention is also applicable when other recording media, such as X-ray film (ordinarily combined with intensifying screens), are used.

An embodiment of the radiation image read-out apparatus in accordance with the present invention will be described hereinbelow with reference to FIGS. 3, 5, and 6. This embodiment is applied to one-shot energy subtraction processing.

In FIGS. 5 and 6, when the first stimulable phosphor sheet 5 is spaced a distance, D (D=f), from the X-ray tube 2 and the second stimulable phosphor sheet 7 is spaced a distance, d (d=d1+d2), from the first stimulable phosphor sheet 5 during the image recording operation, the size of the second X-ray image 4a' stored on the second stimulable phosphor sheet 7 is $$\left(1 + \frac{d}{D}\right)$$

times as large as the size of the first X-ray image 4a stored on the first stimulable phosphor sheet 5. Therefore, the positions of the first X-ray image 4a and the second X-ray image 4a' deviate to a large extent at the peripheral parts of the images.

After the first X-ray image and the second X-ray image have been stored respectively on the first stimulable phosphor sheet 5 and the second stimulable phosphor sheet 7 in the X-ray image recording apparatus 1 shown in FIG. 5, the X-ray images are read out from the sheets 5 and 7 in the X-ray image read-out apparatus 10 shown in FIG. 3 in the same manner as that described above. The first image signal SO1 and the second image signal SO2 thus obtained are stored in the internal memory of the image processing and displaying apparatus 30 shown in FIG. 3.

When the second X-ray image is read out from the second stimulable phosphor sheet 7 with the X-ray image read-out apparatus 10 shown in FIG. 3, the speed of the operation means (not shown in FIG. 3), e.g. a motor, which operates the sheet conveyance means 15 and conveys the second stimulable phosphor sheet 7 in the sub-scanning direction, is set to $$\left(1 + \frac{d}{D}\right)$$

times the speed, at which the first stimulable phosphor sheet 5 was conveyed in the sub-scanning direction. Also, during the image readout from the second stimulable phosphor sheet 7, the A/D converter 26 for sampling the analog signal S, which is generated during the main scanning and which is received from the photomultiplier 24, is adjusted such that the sampling period is $$\left(1 + \frac{d}{D}\right)$$

times the sampling period which was employed during the image readout from the first stimulable phosphor sheet 5. In this manner, during the image readout from the second stimulable phosphor sheet 7, the speed, at which the second stimulable phosphor sheet 7 is scanned in the subscanning direction and the main scanning direction, is substantially set as being $$\left(1 + \frac{d}{D}\right)$$

times the speed, at which the first stimulable phosphor sheet 5 is scanned in the sub-scanning direction and the main scanning direction.

After the two image signals SO1 and SO2, on which subtraction processing is to be carried out, are stored in the internal memory, they are read therefrom. Subtraction processing is then carried out on the two image signals SO1 and SO2.

At this time, the positions of the two X-ray images represented by the first image signal SO1 and the second image signal SO2 are adjusted with the method disclosed in Japanese Unexamined Patent Publication No. 58(1983)-163338.

After the adjustment of the positions is carried out, subtraction processing is carried out on the image signals SO1 and SO2. Specifically, the image signals SO1 and SO2 are weighted, and the image signal components of the weighted image signals are subtracted from each other which represent the image information stored at corresponding picture elements in the two X-ray images. Thus an image signal S1 is obtained, which can be expressed as $$S1 = Wa \cdot SO1 - Wb \cdot SO2 + C$$

where Wa and Wb each denote a weighting coefficient, and C denotes a bias component. The image signal S1 represents an image corresponding to the difference between the two X-ray images. The image signal S1 is fed from the main body 34 into the CRT display device 32 of the image processing and displaying apparatus 30. The CRT display device 32 reproduces a visible image (an energy subtraction image) from the image signal S1 and displays it.

In the aforesaid embodiment of the radiation image read-out apparatus in accordance with the present invention, the two stimulable phosphor sheets are utilized. Alternatively, only a single stimulable phosphor sheet may be utilized which is composed of a plurality of stimulable phosphor layers. As another alternative, a stimulable phosphor sheet composed of a single stimulable phosphor layer may be utilized, and X-ray images, which are recorded at parts in the vicinity of the front surface and the rear surface of the stimulable phosphor layer, may be read out.

In cases where superposition processing is to be carried out, the filter 6 shown in FIG. 5 is omitted, and an addition process is carried out in lieu of the subtraction process. In such cases, the radiation image read-out apparatus in accordance with the present invention may also operate in the same manner as that described above.

We claim:

1. An energy subtraction processing method for radiation images, which comprises the steps of:
  i) irradiating radiation, which has been produced by a radiation source and which comprises radiation components having energy levels covering a predetermined energy range, to an object,
  ii) irradiating the radiation, which has passed through said object, to a recording medium capable of recording a plurality of radiation images during its exposure to radiation with different energy distributions, whereby a plurality of radiation images of said object are recorded on said recording medium, iii) from said recording medium on which the plurality of said radiation images have been recorded, obtaining a plurality of image signals representing the plurality of said radiation images of said object, (iv) carrying out a modulated transfer function (MTF) correcting process on the plurality of said image signals representing the plurality of said radiation images of said object, thereby substantially eliminating differences between MTF's of said radiation images of said object represented by the plurality of said image signals, and v) carrying out subtracting operations on image signals, which are obtained from said MTF correcting process.

2. An energy subtraction processing method for radiation images as defined in claim 1 wherein said MTF correcting process is carried out with an unsharp mask processing technique.

3. An energy subtraction processing method for radiation images as defined in claim 1 wherein said recording medium is a stimulable phosphor sheet.

4. An energy subtraction processing method for radiation images as defined in claim 1 wherein said radiation is X-rays.

5. An energy subtraction processing method for radiation images, which comprises the steps of:

i) irradiating radiation, which has been produced by a radiation source and which comprises radiation components having energy levels covering a predetermined energy range, to an object, ii) irradiating the radiation, which has passed through said object, to a plurality of recording media, each of which is capable of recording one of a plurality of radiation images during its exposure to radiation with different energy distributions, whereby the radiation images of said object are recorded on the plurality of said recording media, iii) from the plurality of said recording media on which said radiation images have been recorded, obtaining a plurality of image signals representing said radiation images of said object, iv) carrying out a modulated transfer function (MTF) correcting process on the plurality of said image signals, representing said radiation images of said object, thereby substantially eliminating differences between MTF's of said radiation images of said object represented by the plurality of said image signals, and v) carrying out subtracting operations on image signals, which are obtained from said MTF correcting process.

6. An energy subtraction processing method for radiation images as defined in claim 5 wherein said MTF correcting process is carried out with an unsharp mask processing technique.

7. An energy subtraction processing method for radiation images as defined in claim 5 wherein said recording media are stimulable phosphor sheets.

8. An energy subtraction processing method for radiation images as defined in claim 5 wherein said radiation is X-rays.

9. An energy subtraction processing apparatus for radiation images, which comprises:

i) a recording unit comprising:

a) a radiation source which produces radiation comprising radiation components having energy levels covering a predetermined energy range, b) an object locating section in which an object is located, and c) a sheet supporting section which is located facing said radiation source with said object locating section intervening between said sheet supporting section and said radiation source, and in which a recording medium capable of recording a plurality of radiation images during its exposure to radiation with different energy distributions is located, ii) a read-out unit for obtaining a plurality of image signals representing a plurality of radiation images of said object from said recording medium, on which said radiation images of said object have been recorded in said recording unit, and iii) an operation unit comprising:

a) a modulated transfer function (MTF) correcting operation means for carrying out an MTF correcting process on the plurality of said image signals representing the plurality of said radiation images of said object, thereby substantially eliminating differences between MTF's of said radiation images of said object represented by the plurality of said image signals, and b) a subtracting operation means for carrying out subtracting operations on image signals, which are obtained from said MTF correcting process.

10. An energy subtraction processing apparatus for radiation images as defined in claim 9 wherein said MTF correcting process is carried out with an unsharp mask processing technique.

11. An energy subtraction processing apparatus for radiation images as defined in claim 9 wherein said recording medium is a stimulable phosphor sheet.

12. An energy subtraction processing apparatus for radiation images as defined in claim 9 wherein said radiation is X-rays.

13. An energy subtraction processing apparatus for radiation images, which comprises:

i) a recording unit comprising:

a) a radiation source which produces radiation comprising radiation components having energy levels covering a predetermined energy range, b) an object locating section in which an object is located, and c) a sheet supporting section which is located facing said radiation source with said object locating section intervening between said sheet supporting section and said radiation source, and in which a plurality of recording media are located, each of said recording media being capable of recording one of a plurality of radiation images during its exposure to radiation with different energy distributions, ii) a read-out unit for obtaining a plurality of image signals representing the radiation images of said object from the plurality of said recording media, on which said radiation images of said object have been recorded in said recording unit, and iii) an operation unit comprising:

a) a modulated transfer function (MTF) correcting operation means for carrying out an MTF correcting process on the plurality of said image signals representing said radiation images of said object, thereby substantially eliminating differences between MTF's of said radiation images of said object represented by the plurality of said image signals, and b) a subtracting operation means for carrying out subtracting operations on image signals, which are obtained from said MTF correcting process.

14. An energy subtraction processing apparatus for radiation images as defined in claim 13 wherein said MTF correcting process is carried out with an unsharp mask processing technique.

15. An energy subtraction processing apparatus for radiation images as defined in claim 13 wherein said recording media are stimulable phosphor sheets.

16. An energy subtraction processing apparatus for radiation images as defined in claim 13 wherein said radiation is X-rays.

17. An energy subtraction processing method for radiation images, which comprises the steps of:
  i) irradiating radiation, which has been produced by a radiation source and which comprises radiation components having energy levels covering a predetermined energy range, to an object,
  ii) irradiating the radiation, which has passed through said object, to a recording medium capable of recording a plurality of radiation images during its exposure to radiation with different energy distributions, whereby a plurality of radiation images of said object are recorded on said recording medium,
  iii) from said recording medium on which the plurality of said radiation images have been recorded, obtaining a plurality of image signals representing the plurality of said radiation images of said object,
  iv) carrying out a size correcting process on the plurality of said image signals representing the plurality of said radiation images of said object thereby making sizes of said radiation images of said object represented by the plurality of said image signals substantially identical with one another, and
  v) carrying out subtracting operations on image signals, which are obtained from said size correcting process.

18. An energy subtraction processing method for radiation images as defined in claim 17 wherein said recording medium is a stimulable phosphor sheet.

19. An energy subtraction processing method for radiation image as defined in claim 17 wherein said radiation is X-rays.

20. An energy subtraction processing method for radiation images, which comprises the steps of:
  i) irradiating radiation, which has been produced by a radiation source and which comprises radiation components having energy levels covering a predetermined energy range, to an object,
  ii) irradiating the radiation, which has passed through said object, simultaneously to a plurality of recording media, each of which is capable of recording one of a plurality of radiation images during its exposure to radiation with different energy distributions, whereby the radiation images of said object are recorded on the plurality of said recording media,
  iii) from the plurality of said recording media on which said radiation images have been recorded, obtaining a plurality of image signals representing said radiation images of said object,
  iv) carrying out a size correcting process on the plurality of said image signals representing said radiation images of said object thereby making sizes of said radiation images of said object represented by the plurality of said image signals substantially identical with one another, and
  v) carrying out subtracting operations on image signals, which are obtained from said size correcting process.

21. An energy subtraction processing method for radiation images as defined in claim 20 wherein said recording media are stimulable phosphor sheets.

22. An energy subtraction processing method for radiation images as defined in claim 20 wherein said radiation is X-rays.

23. An energy subtraction processing apparatus for radiation images, which comprises:
  i) a recording unit comprising:
    a) a radiation source which produces radiation comprising radiation components having energy levels covering a predetermined energy range,
    b) an object locating section in which an object is located, and
    c) a sheet supporting section which is located facing said radiation source with said object locating section intervening between said sheet supporting section and said radiation source, and in which a recording medium capable of recording a plurality of radiation images during its exposure to radiation with different energy distributions is located,
  ii) a read-out unit for obtaining a plurality of image signals representing a plurality of radiation images of said object from said recording medium, on which said radiation images of said object have been recorded in said recording unit, and
  iii) an operation unit comprising:
    a) a size correcting operation means for carrying out a size correcting process on the plurality of said image signals representing the plurality of said radiation images of said object, thereby making sizes of said radiation images of said object represented by the plurality of said image signals substantially identical with one another; and
    b) a subtracting operation means for carrying out subtracting operations on image signals, which are obtained form said size correcting process.

24. An energy subtraction processing apparatus for radiation images as defined in claim 23 wherein said recording medium is a stimulable phosphor sheet.

25. An energy subtraction processing apparatus for radiation images as defined in claim 23 wherein said radiation is X-rays.

26. An energy subtraction processing apparatus for radiation images, which comprises:
  i) a recording unit comprising:
    a) a radiation source which produces radiation comprising radiation components having energy levels covering a predetermined energy range,
    b) an object locating section in which an object is located, and
    c) a sheet supporting section which is located facing said radiation source with said object locating section intervening between said sheet supporting section and said radiation source, and in which a plurality of recording media are located simultaneously, each of said recording media being capable of recording one of a plurality of radiation images during its exposure to radiation with different energy distributions, ii) a read-out unit for obtaining a plurality of image signals representing the radiation images of said object from the plurality of said recording media, on which said radiation images of said object have been recorded in said recording unit, and iii) an operation unit comprising:
   a) a size correcting operation means for carrying out a size correcting process on the plurality of said image signals representing said radiation images of said object, thereby making sizes of said radiation images of said object represented by the plurality of said image signals substantially identical with one another, and
   b) a subtracting operation means for carrying out subtracting operations on image signals, which are obtained from said size correcting process.

27. An energy subtraction processing apparatus for radiation images as defined in claim 26 wherein said recording media are stimulable phosphor sheets.

28. An energy subtraction processing apparatus for radiation images as defined in claim 26 wherein said radiation is X-rays.

29. A superposition processing method for radiation images, which comprises the steps of:
   i) irradiating radiation, which has been produced by a radiation source, to an object,
   ii) irradiating the radiation, which has passed through said object, simultaneously to a plurality of recording media, each of which is capable of recording one of a plurality of radiation images during its exposure to radiation, whereby the radiation images of said object are recorded on the plurality of said recording media,
   iii) from the plurality of said recording media on which said radiation images have been recorded, obtaining a plurality of image signals representing said radiation images of said object,
   iv) carrying out a size correcting process on the plurality of said image signals representing said radiation images of said object thereby making sizes of said radiation images of said object represented by the plurality of said image signals substantially identical with one another, and
   v) carrying out superposing operations on image signals, which are obtained from said size correcting process.

30. A superposition processing method for radiation images as defined in claim 29 wherein a single recording medium is employed which is capable of serving as the plurality of said recording media.

31. A superposition processing method for radiation images as defined in claim 29 wherein said recording media are stimulable phosphor sheets.

32. A superposition processing method for radiation images as defined in claim 29 wherein said radiation is X-rays.

33. A superposition processing apparatus for radiation images, which comprises:
   i) a recording unit comprising:
      a) a radiation source which produces radiation,
      b) an object locating section in which an object is located, and
      c) a sheet supporting section which is located facing said radiation source with said object locating section intervening between said sheet supporting section and said radiation source, and in which a plurality of recording media are located simultaneously, each of said recording media being capable of recording one of a plurality of radiation images during its exposure to radiation,
   ii) a read-out unit for obtaining a plurality of image signal representing the radiation images of said object form the plurality of said recording media, on which said radiation images of said object have been recorded in said recording unit, and
   iii) an operation unit comprising:
      a) a size correcting operation means for carrying out a size correcting process on the plurality of said image signals representing said radiation images of said object, thereby making sizes of said radiation images of said object represented by the plurality of said image signals substantially identical with one another, and
      b) a superposing operation means for carrying out superposing operations on image signals, which are obtained from said size correcting process.

34. A superposition processing apparatus for radiation images as defined in claim 33 wherein a single recording medium is employed which is capable of serving as the plurality of said recording media.

35. A superposition processing apparatus for radiation images as defined in claim 33 wherein said recording media are stimulable phosphor sheets.

36. A superposition processing apparatus for radiation images as defined in claim 33 wherein said radiation is X-rays.

37. A radiation image read-out apparatus comprising:
   i) a recording unit comprising:
      a) a radiation source which produces radiation; and
      b) two stimulable phosphor sheets located in parallel and spaced a distance d from each other, each of said stimulable phosphor sheets being capable of recording one of a plurality of radiation images during its exposure to radiation;
   ii) a read-out unit for obtaining a plurality of image signals representing the plurality of radiation images recorded on said stimulable phosphor sheets; and
   iii) an operation unit comprising a size correcting operation means for carrying out a size correcting process on the plurality of said image signals, thereby making sizes of said radiation images represented by the plurality of said image signals substantially identical with one another, wherein, after said radiation images have been recorded on said two stimulable phosphor sheets, the radiation images are read out from the two stimulable phosphor sheets with an image read-out operation, in which each of the two stimulable phosphor sheets is two-dimensionally scanned with stimulating rays, which cause each of said stimulable phosphor sheets to emit light in proportion to the amount of energy stored thereon during its exposure to the radiation, whereby the emitted light is detected, wherein said size correcting operating means comprises means for setting the speed at which said two stimulable phosphor sheets are scanned two-dimensionally, such that the scanning speed of the stimulable phosphor sheet that was located remote from said radiation source during said image recording operation is $(1+d/D)$ times the scanning speed of the stimulable phosphor sheet that was located close to said radiation source during said image recording operation, where D denotes the distance between said radiation source and said stimulable phosphor sheet that was located close to said radiation source during said image recording operation.

38. A radiation image read-out apparatus as defined in claim 37 wherein the speed, at which a stimulable phosphor sheet is scanned in a sub-scanning direction, is set by adjusting the speed, at which the stimulable phosphor sheet is conveyed, and the speed, at which a stimulable phosphor sheet is scanned in a main scanning direction, is set by adjusting the intervals of sampling during the detection of the light emitted by the stimulable phosphor sheet.

39. A radiation image read-out apparatus as defined in claim 37 wherein a single stimulable phosphor sheet is employed which is capable of serving as two said stimulable phosphor sheets.

40. A radiation image read-out apparatus as defined in claim 37 wherein said radiation is X-rays.

* * * * *